(12) United States Patent
Carroll

(10) Patent No.: US 6,487,403 B2
(45) Date of Patent: *Nov. 26, 2002

(54) WIRELESS UNIVERSAL PROVISIONING DEVICE

(75) Inventor: Christopher Paul Carroll, Framingham, MA (US)

(73) Assignee: Verizon Laboratories Inc., Waltham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,288

(22) Filed: Aug. 19, 1999

(65) Prior Publication Data
US 2001/0041591 A1 Nov. 15, 2001

(51) Int. Cl.[7] .................................................. H04M 3/00
(52) U.S. Cl. ...................................... 455/419; 455/420
(58) Field of Search .............................. 455/418, 419, 455/420, 411, 551, 556, 426, 557, 550, 517

(56) References Cited

U.S. PATENT DOCUMENTS

| | | | | | |
|---|---|---|---|---|---|
| 4,731,605 | A | * | 3/1988 | Nixon | 341/176 |
| 5,062,132 | A | * | 10/1991 | Yasuda et al. | 379/355.06 |
| 5,077,790 | A | * | 12/1991 | D'Amico et al. | 380/23 |
| 5,297,191 | A | * | 3/1994 | Gerszberg | 455/419 |
| 5,297,192 | A | | 3/1994 | Gerszberg | 379/59 |
| 5,333,177 | A | * | 7/1994 | Braitberg et al. | 379/441 |
| 5,414,751 | A | * | 5/1995 | Yamada | 455/418 |
| 5,481,259 | A | * | 1/1996 | Bane | 340/870.03 |
| 5,485,505 | A | * | 1/1996 | Norman et al. | 455/419 |
| 5,524,135 | A | * | 6/1996 | Mizikovsky et al. | 455/419 |
| 5,594,782 | A | | 1/1997 | Zicker et al. | 379/63 |
| 5,603,084 | A | * | 2/1997 | Henry, Jr. et al. | 455/419 |
| 5,619,213 | A | * | 4/1997 | Hays, III | 343/702 |
| 5,649,321 | A | * | 7/1997 | Kellenberger | 455/221 |
| 5,799,084 | A | | 8/1998 | Gallagher et al. | 380/23 |
| 5,821,903 | A | * | 10/1998 | Williams | 343/702 |
| 5,878,339 | A | | 3/1999 | Zicker et al. | 455/419 |
| 5,881,235 | A | * | 3/1999 | Mills | 709/221 |
| 5,903,835 | A | * | 5/1999 | Dent | 455/427 |
| 5,909,183 | A | * | 6/1999 | Borgstahl et al. | 340/825.22 |
| 5,926,756 | A | * | 7/1999 | Piosenka et al. | 455/418 |
| 5,930,703 | A | * | 7/1999 | Cairns | 455/418 |
| 5,937,347 | A | * | 8/1999 | Gordon | 455/415 |
| 5,940,752 | A | * | 8/1999 | Henrick | 455/419 |
| 5,956,634 | A | * | 9/1999 | Otterson et al. | 455/410 |
| 5,974,312 | A | * | 10/1999 | Hayes, Jr. et al. | 455/419 |
| 6,014,561 | A | * | 1/2000 | Molne | 455/419 |
| 6,029,065 | A | * | 2/2000 | Shah | 455/414 |
| 6,041,229 | A | * | 3/2000 | Turner | 455/418 |
| 6,043,780 | A | * | 3/2000 | Funk et al. | 343/702 |
| 6,122,523 | A | * | 9/2000 | Zicker et al. | 455/551 |

FOREIGN PATENT DOCUMENTS

| | | | | |
|---|---|---|---|---|
| EP | 0459344 | * | 12/1991 | |
| GB | 2249459 | * | 6/1992 | |
| WO | 98/41044 | * | 9/1998 | H04Q/7/00 |

OTHER PUBLICATIONS

Product brochure, Synacom's Validator, 3 pages included.

* cited by examiner

Primary Examiner—Vivian Chin
Assistant Examiner—Charles N. Appiah
(74) Attorney, Agent, or Firm—Leonard Charles Suchyta; James K. Weixel (57) ABSTRACT

A system includes at least one wireless communications device having a standard wireless interface and a wireless provisioning device that provisions the wireless communications device. The wireless provisioning device uses the standard wireless interface to transfer the provisioning information, including an authentication key, to the wireless communications device when both devices are interconnected via a wireline link between a transceiver antenna of the wireless communications device and a communication unit of the provisioning device.

20 Claims, 6 Drawing Sheets

WIRELESS UNIVERSAL PROVISIONING DEVICE

BACKGROUND OF THE INVENTION

A. Field of the Invention

The present invention relates generally to wireless communications, and more particularly, to the use of a Wireless Universal Provisioning Device (WUPD) for the activation of wireless communication devices.

B. Description of the Related Art

After purchasing a wireless communication device, such as a cellular telephone, the user must have the device activated or provisioned for use. Provisioning is the programming of a wireless communication device for use by the owner. Several conventional systems have been proposed for inserting provisioning information (e.g., secret privacy and authentication keys, or unique operational information) into these devices.

The user/carrier key management infrastructure for the authentication-based wireless system uses a key hierarchy generated from a user's unique authentication key (A-key). The A-key is, for example, a 64-bit value used to generate a user's temporary authentication keys as well as privacy keys for data, voice, and messaging. There are currently several proposed and implemented approaches for A-key generation and distribution.

In one approach, the A-key is generated by the Service Provider and input to the device using either manual entry by the customer or electronic distribution at the point of sale. This approach requires training of sales agents, which is costly for stores, and extra time for each purchase, which can better be used for selling. Customers could manually enter the keys, but this method is considered unacceptable to the wireless industry because it leads to difficult key distribution mechanisms, and because the industry believes that many customers may find this extra task unacceptable.

In the case where the key is distributed through electronic mechanisms, wireless devices currently use a data port of the provisioning device to load and unload device information through a data cable. This data port is not standardized for most types of equipment, especially for wireless devices such as cellular telephones.

In the cellular industry, for example, cellular and Personal Communications System (PCS) telephone manufactures typically include data ports that are unique and proprietary in their handsets. In some instances, the same manufacturer will have different data port form factors for different models of their handsets. In order to provision multiple makes and models for cellular and PCS handsets, a provisioning device must have many connectors and/or adapters to enable activation of any particular telephone. Additionally, different makes and models of cellular and PCS telephones use different communication protocols for activating the telephones, requiring a provisioning device to support protocols for a wide variety of telephone models.

An example of one conventional provisioning device requires cables and protocol information for each wireless device to facilitate provisioning. Operators must sift through many connectors and follow an extensive and confusing menu to use the proper provisioning protocol. Additionally, some manufacturers refuse to provide programming protocol information for their wireless devices, thereby preventing the provisioning device from programming certain makes and models.

Figure 1:
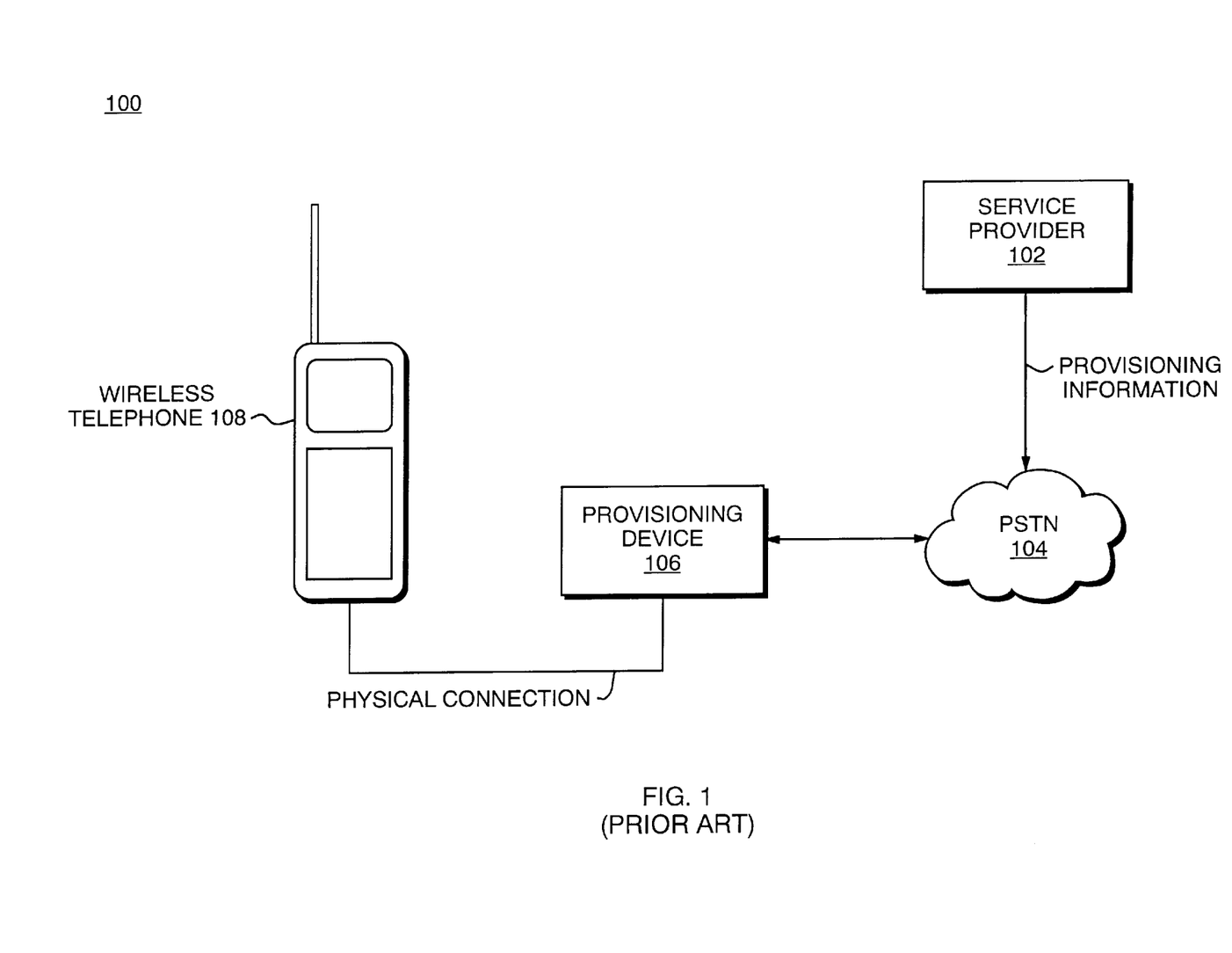
FIG. 1 is a block diagram of a conventional system for provisioning a cellular telephone.

FIG. 1 is a diagram of a conventional system 100 for provisioning a wireless communications device 108 using a conventional provisioning device 106. The system 100 includes a Service Provider 102, a provisioning device 106, and a wireless telephone 108. In general, the term "Service Provider" refers to the computer that manages the network in which the wireless telephone operates, and the term "provisioning device" refers to an electronic device that programs the wireless telephone to activate the telephone for use.

In the conventional system 100, the Service Provider 102 generates the provisioning information to activate the wireless telephone 108. The Service Provider 102 sends the provisioning information to the provisioning device 106 via the PSTN 104. The provisioning device 106 downloads the provisioning information into the wireless telephone 108 (either cellular or PCS) through a physical connection.

Retailers found it cumbersome to use several different types of equipment for provisioning existing wireless equipment, while further requiring new devices to provision new telephone models. Since these different makes and models of telephones operate in the same network, using the same air-interface communications protocol, some systems found it more efficient to use the standard air interface to provision each telephone, thus eliminating the provisioning device's need to handle multiple connectors and protocols.

Figure 2:
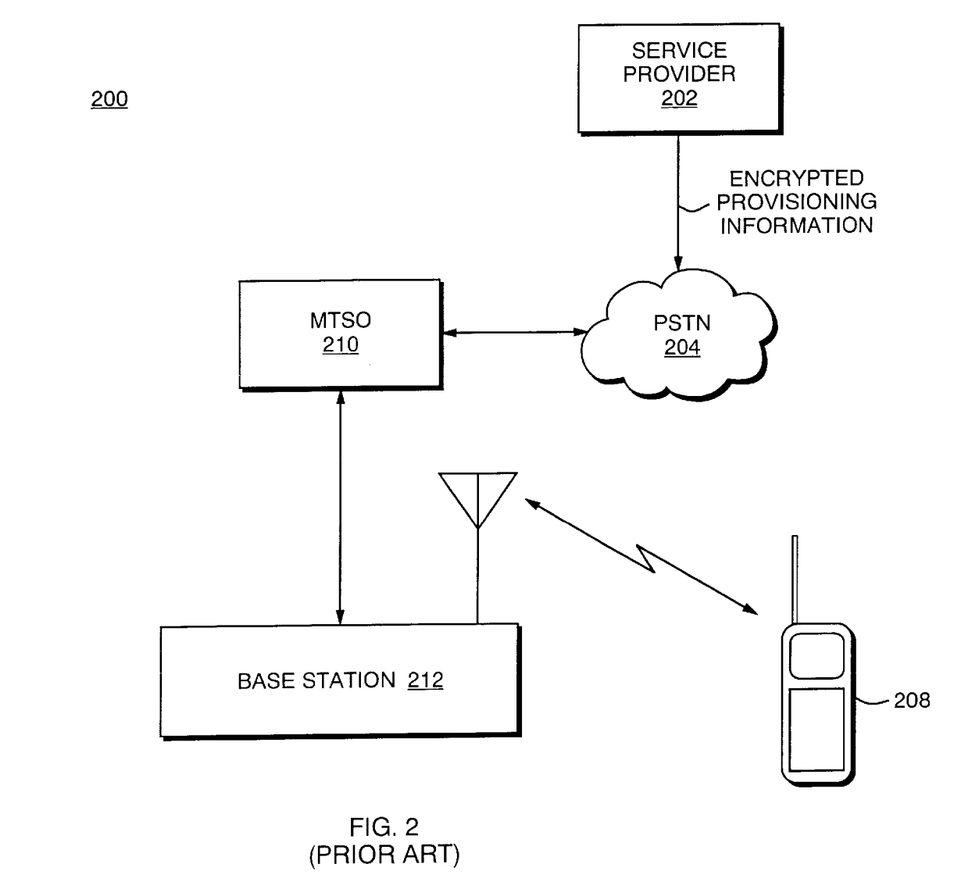
FIG. 2 is a block diagram of another conventional system for provisioning a cellular telephone.

One of these systems uses an Over-the-Air Service Provisioning (OTASP) approach. Using this approach, a cellular/PCS network service enables provisioning of telephones over the air using network protocols. FIG. 2 illustrates a system 200 that implements OTASP. The system 200 includes a Service Provider 202, a Mobile Telephone Switching Office (MTSO) 210, a base station 212, and a wireless telephone 208. In general, the MTSO 210 is responsible for connecting all the wireless telephones 208 to the PSTN 204 in a cellular system, while the base station 212 serves as an interface between the MTSO 210 and the wireless telephone 208.

In the system 200 of FIG. 2, the Service Provider 202 sends encrypted provisioning information to the MTSO 210, via the PSTN 204. The MTSO 210 passes along the provisioning information to the base station 212 via a land line. Finally, the base station 212 sends the provisioning information (over the air) to the cellular telephone 208.

A major disadvantage of this approach is that the transmissions between the telephone 208 and the base station 212 are susceptible to eavesdropping. To prevent the successful interception of provisioning information, cellular networks usually employ computationally expensive and time consuming cryptographic processes to encrypt the provisioning information.

Specifically, OTASP uses collaborative key generation and dissemination by the wireless communication device 208 and the Service Provider 202, or carrier, after purchase. It does not require the manufacturer to perform unique operations for each telephone. The ultimate goal of OTASP is to enable a potential customer to purchase a wireless communication device that activates almost instantly without the hassle of waiting for or dealing with an activation agent. In order to activate the customer's communication device, the carrier must input a unique A-key into the communication device in an unobtrusive, but secure manner.

Public-Key technologies, such as the RSA key exchange and the Diffie-Hellman key exchange, have been considered to provide secure A-key distribution in cellular networks. Although these public-key technologies have advantages, there are significant disadvantages to cellular telephone manufacturers, cellular switch manufacturers, cellular carriers, and most importantly cellular subscribers which affect the security, performance, and efficiency of the cellular network.

One such problem with these public-key technologies is their susceptibility to a man-in-the-middle (MIM) attack. In a MIM attack, a hacker uses a scanner to intercept the signal emitted from a wireless telephone in order to fraudulently obtain the telephone's electronic serial number from the signal. The hacker can program a cellular telephone with the stolen serial number in order to charge another person for his personal telephone. Both the Diffie-Hellman key exchange and the RSA key exchange are susceptible to these attacks. A MIM attack is possible using existing commercial technology and could be implemented relatively inexpensively. Diffie-Hellman key exchange enables rapid determination of a MIM attack, but allows attacks by hackers which cause service to be denied to a new subscriber, which in turn may be unacceptable to Service Providers.

In both RSA and Diffie-Hellman key exchange, the encrypted A-Key is transmitted over the air interface between the Service Provider and the new subscriber. Because the A-key is being transmitted over the air, it may be susceptible to cryptanalysis. Both RSA and Diffie-Hellman key exchange also require exponentiation, which is computationally intensive for an 8 or 16-bit microcontroller within existing wireless communication devices (e.g., cellular telephones). For instance, each exponentiation in a Diffie-Hellman key exchange may require two or three minutes of computation time within a cellular telephone, forcing an OTASP session to last four to six minutes. This six minutes would essentially be dead time in which the new subscriber and carrier would have to wait for voice or message privacy before the subscriber can safely provide important personal information, such as a credit card number.

In these systems, each wireless communication device is required to perform computationally intensive exponentiations. In order to reduce exponentiation time and alleviate the main Central Processing Unit from excessive work, an Arithmetic Processing Unit or Public-Key Digital Signal Processor may be added to the device, increasing unit cost. Each wireless communication device may also use a dedicated Random Number Generator chip to provide the secure random number generation required by a Diffie-Hellman key exchange, also increasing unit cost. This additional hardware may reduce the battery life and performance of the devices. Also, additional hardware may be required at the switch to perform random number generation and exponentiation.

In view of the problems in the conventional systems, there is a need for a provisioning device that (1) reduces network loading and activation delays, without compromising provisioning information (e.g., A-key) transfer security; and (2) eliminates the need to handle multiple connectors and protocols.

SUMMARY OF THE INVENTION

Accordingly, it is an object of the present invention to meet the foregoing needs by providing systems and methods that efficiently and securely perform provisioning of cellular telephones and other wireless communication devices.

Specifically, a system for meeting the foregoing needs is disclosed. The system includes at least one wireless communications device having a standard wireless interface, and a wireless provisioning device that provisions the wireless communications device. The wireless provisioning device uses the standard wireless interface to transfer the provisioning information to the wireless communications device when both devices are at close proximity. The provisioning device comprises a computer, having a memory and a processor, which executes a method for provisioning the wireless communications device, and a radio transceiver connected to the computer for transmitting the provisioning information to the wireless communications device.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIG. 5 is a detailed diagram of the WUPD of FIG. 3; and.

DETAILED DESCRIPTION

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention securely perform wireless device authentication and activation. For purposes of the following description, the systems and methods consistent with the present invention are only described with respect to a cellular telephone. The description should be understood to apply to other devices, such as personal digital assistants, pagers, and similar remote communication devices.

EXEMPLARY PROVISIONING SYSTEM

Figure 3:
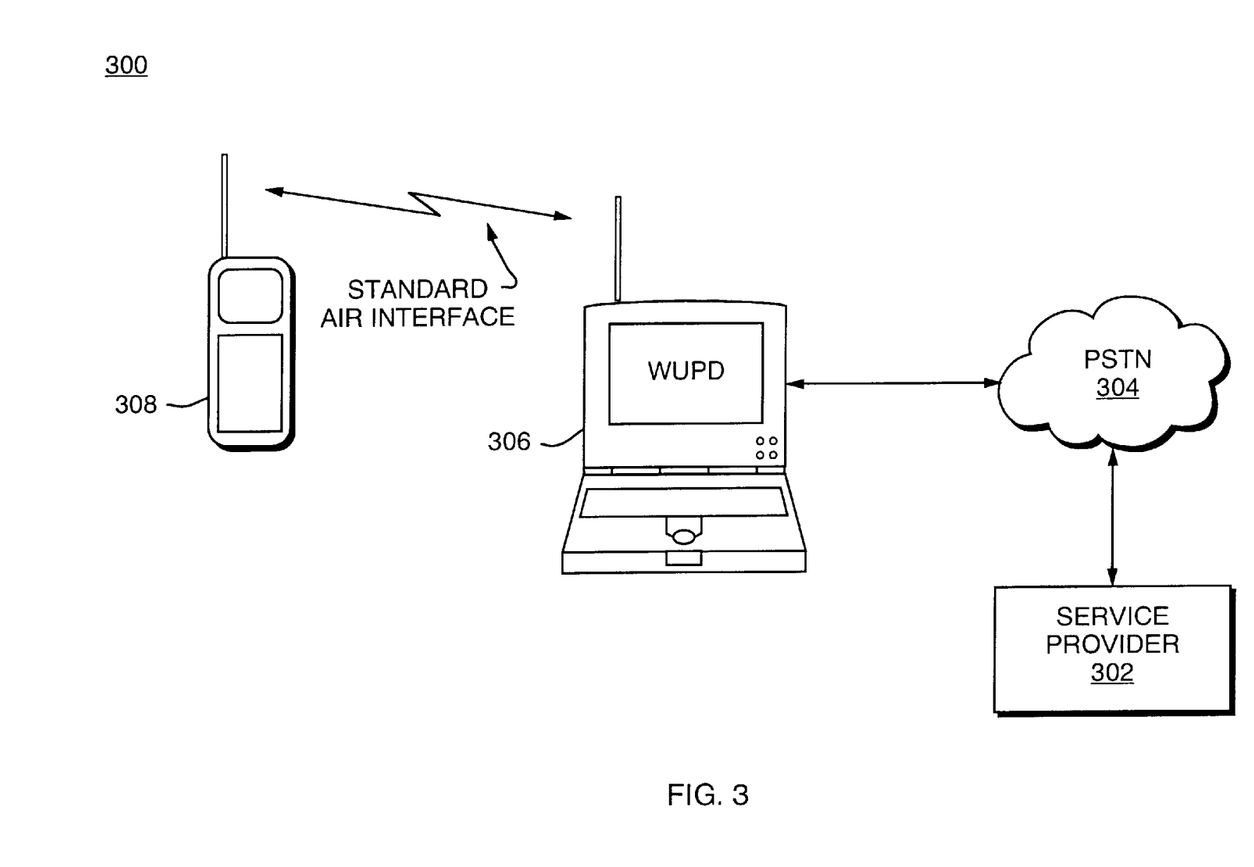
FIG. 3 is a block diagram of a system for provisioning a wireless device in accordance with the present invention.

FIG. 3 shows a system 300 that provisions a cellular telephone in a manner consistent with the present invention. The system 300 includes a cellular telephone 308, a WUPD 306, the PSTN 304, and a Service Provider 302. The WUPD is a device with the ability to use the wireless interface of any equipment (e.g., cellular telephone, PDA, pager, radio receiver, etc.) to download provisioning information, and therefore, it eliminates the need for cables and protocol information that differ for each model of a particular type of device being provisioned. Further, the WUPD, by relying on low power transmissions in order to avoid interception of the provisioning signal, operates independently of the cellular telephone network.

In the system 300, the Service Provider 302 generates provisioning information and sends it to the WUPD 306 through the PSTN 304. Thereafter, the WUPD 306 uses the standard air interface of the cellular telephone 308 to download the provisioning information into the cellular telephone 308.

In order to facilitate WUPD provisioning, wireless handset standards must be modified to enable the handset to lock on to the WUPD to receive provisioning data. The term "lock" refers to the process that a cellular telephone undergoes when it is first turned on. When first turned on, the cellular telephone polls different forward control channels transmitted by different base stations, by scanning through a range of frequencies. The cellular telephone then "locks" or tunes to the frequency channel having the stronger signal. The cellular telephone constantly monitors the control channel to which it is locked. When this control channel signal goes below a detectable or usable level, the cellular telephone again polls for a new control channel and tunes to that control channel frequency.

It is important to distinguish the locking of the cellular telephone to a control channel from the process of handoff in a cellular network. Handoffs occur whenever a cellular telephone enters a new cell area during use. Hence, handoffs occur only when a telephone conversation (or transmission of data) is in process. For a cellular telephone call to take place, and therefore for a handoff to occur, the handset must already have the provisioning information downloaded, that is, the cellular telephone has to be activated.

In one implementation, the cellular telephone locks to the WUPD automatically. In order to accomplish this, the WUPD has to mimic a cellular network control channel. Also, the frequency signal transmitted by the WUPD would need to be stronger than all the other control channel signals present in the location where the provisioning of the telephone takes place. The signals that are "present" are the control channel signals being transmitted by a base station that are capable of being detected by the cellular telephone. This would contravene one of the goals of the present invention because the WUPD transmission power would not be as low as possible, since it must overcome the other control channel signals and, therefore, increase the risk of eavesdropping. Accordingly, if this mode of locking the cellular telephone to the WUPD is implemented, the provisioning of the cellular telephone would preferably, although not necessarily, have to be performed in a shielded case.

Another option for automatically locking the cellular telephone to the WUPD is for the WUPD to first transmit at a power level that is higher than the other forward control channels that are present, and once the cellular telephone locks on to the WUPD, the power level can be decreased as required by the invention. As long as the signal from the WUPD remains detectable, the cellular telephone will stay locked on to the WUPD. The problem with this approach is that there remains the possibility that the WUPD's power level will fall below the threshold and that, therefore, the WUPD power has to be increased again in order to re-lock to the cellular telephone.

An alternative to automatic locking is to force the cellular telephone to tune to a specific frequency channel to receive the provisioning information. To accomplish this, the cellular telephone has to be put in a test mode by either entering a keypad sequence (same as the sequence entered for setting the cellular telephone into provisioning mode), such that it automatically tunes to a particular frequency channel. Once the telephone tunes to the channel, the WUPD transmits the provisioning information.

EXEMPLARY CELLULAR TELEPHONE

Figure 4:
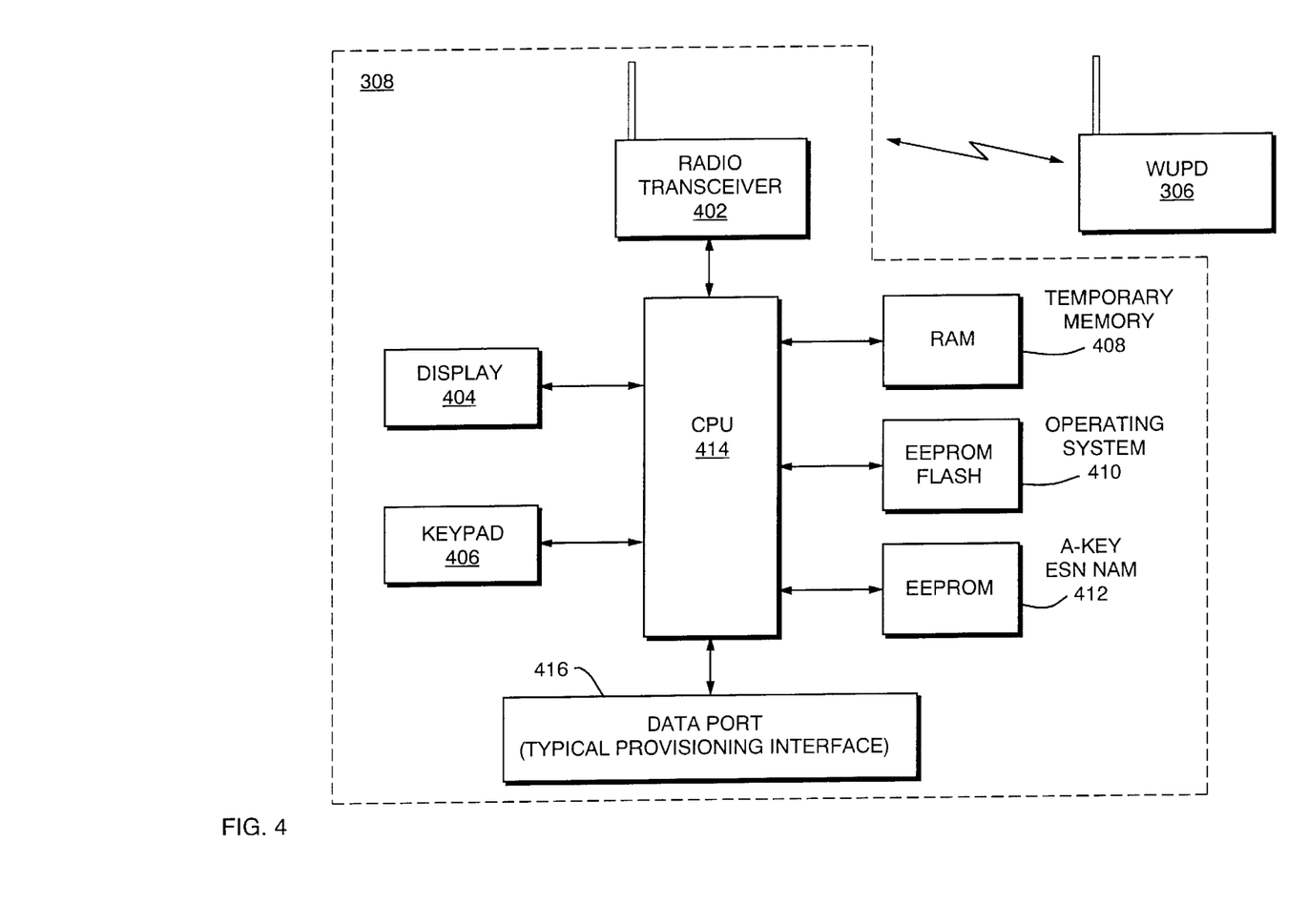
FIG. 4 is a detailed diagram of the wireless device of FIG. 3.

FIG. 4 shows a block diagram of components of a cellular telephone 308. The cellular telephone 308 includes a radio transceiver 402, a display 404, a keypad 406, a Central Processing unit (CPU) 414, a read/write memory (RAM) 408, an electrically erasable programmable read-only memory (EEPROM) 412, a Flash memory 410, and a data port 416.

The radio transceiver component 402 of the cellular telephone 308 receives, downconverts, demodulates, and detects the signal that carries the provisioning message from the WUPD 306. The CPU 414 controls the operation of the cellular telephone 308. The display 404 is a small liquid crystal display screen that displays information to the user of the cellular telephone 308. The keypad 406 is used by the user to dial telephone numbers and to enter sequences of numbers that allow the user to authenticate the cellular telephone 308. The RAM 408 is a type of memory that is used by the CPU 414 to temporarily store data, while both the Flash memory 410 and the EEPROM 412 store permanent information, such as the electronic serial number and the operating system of the cellular telephone 308. The data port 416 receives and transmits data through a physical connection and has typically been used by conventional provisioning devises to provision the cellular telephone 308.

In order to enable a cellular telephone 308 to communicate with the WUPD 306, the memory elements (410, 412) store code as part of the operating system that is used by the cellular telephone to implement the handset standards. This code includes, for example, the deliberate keypad sequence to set the handset 308 into the provisioning mode. One skilled in the art would know how to implement this code.

EXEMPLARY WUPD

Figure 5:
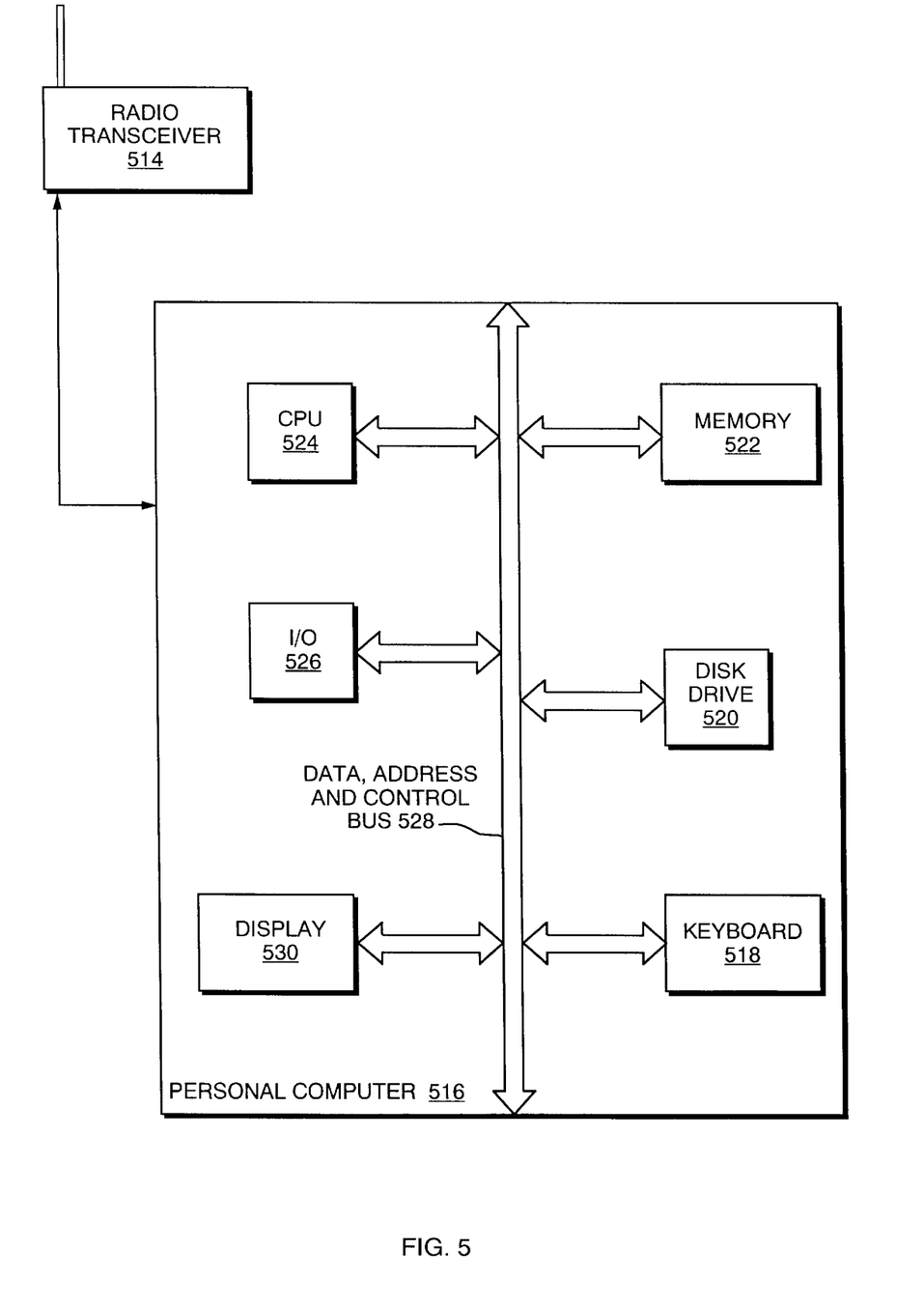

FIG. 5 shows the preferred embodiment of the WUPD 306. The WUPD 306 includes a personal computer 516 connected to a radio transceiver 514 through a physical connection. Alternatively, the computer 516 and transceiver 514 may be integrated in a single unit. The computer 516 includes a processor (CPU) 524, a memory 522, at least one input/output (I/O) port 526, a disk drive 520, a keyboard 518, a display 530, and a data-address-control bus 528.

The computer 516 executes a modular program that could be upgraded every time the user of the WUPD wants to add a new air interface standard. The WUPD program is stored in the memory 522 and manages the communications between the computer 516 and the cellular telephone 308, and between the computer 516 and the Service Provider 302. The data sent to the radio transceiver 514 (via an I/O 526) is in digital form, and the data to be sent to the Service Provider (through the PSTN) is digital data modulated by an internal modem (not shown).

SYSTEM PROCESSING

Figure 6:
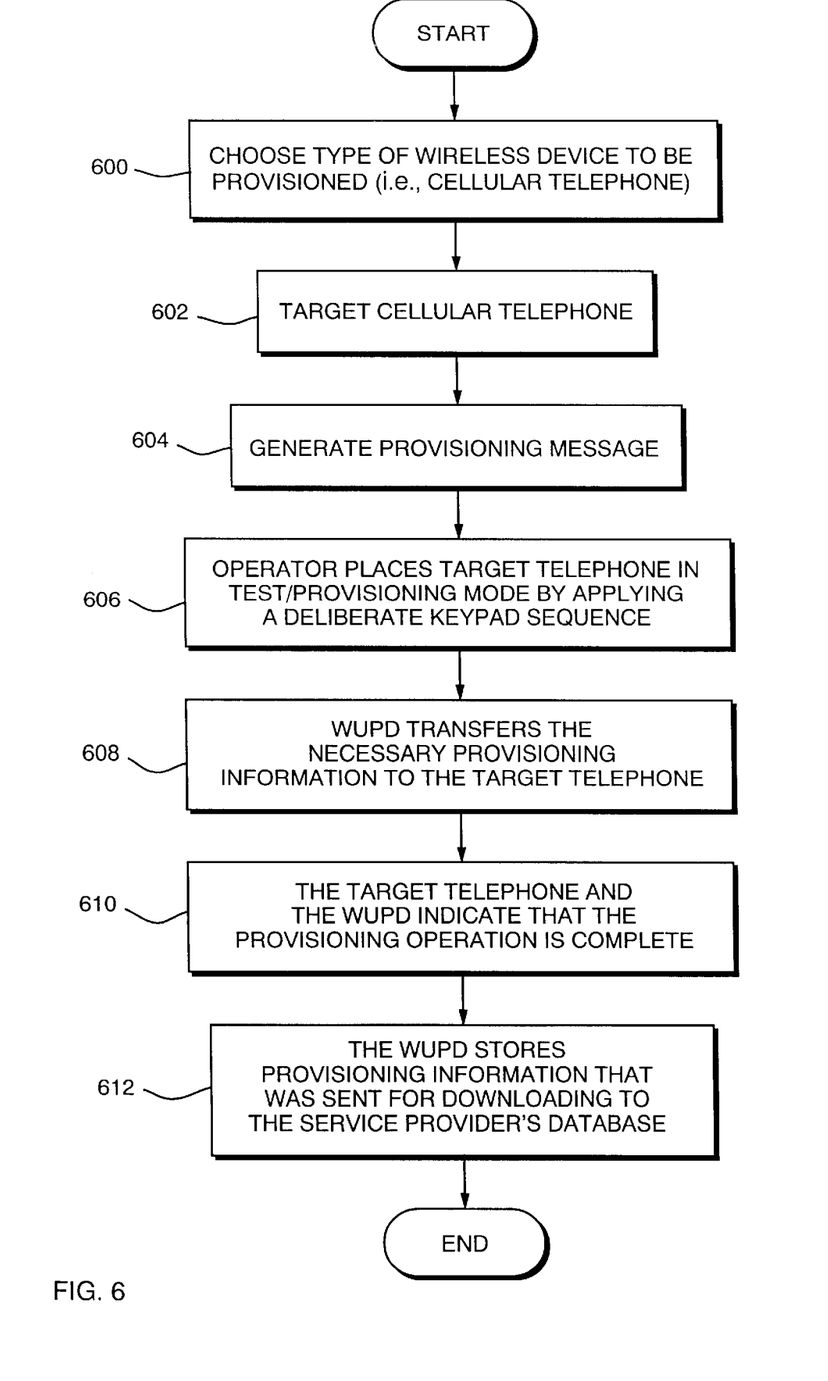
FIG. 6 is a flowchart of a process for provisioning a wireless device according to the present invention.

FIG. 6 shows a flowchart of system processing for provisioning a wireless device according to the present invention. The method is carried out by a program executed by the computer 516 of FIG. 5, but requires human intervention at some points, as explained in the discussion that follows.

A typical provisioning operation with the WUPD, as applied to the activation of a cellular telephone, is performed in the following manner:

1) The WUPD prompts a sales agent or operator to enter the type of device being provisioned (step 600). In this particular example, the operator chooses a cellular telephone.

2) The sales agent/operator targets the cellular telephone to be activated (step 602). This can be done by aiming the antenna of the transceiver 514 to the cellular telephone, or by using a clip-on antenna to physically connect the WUPD's transceiver antenna to the cellular telephone's antenna.

3) The WUPD generates or obtains a provisioning message. In step 604, the provisioning information is generated by either the WUPD or the Service Provider. When the Service Provider generates the provisioning information, the information is sent to the WUPD via the PSTN.

4) The operator sets the target telephone in test/provisioning mode (step 606) using a deliberate keypad sequence (e.g., "FCN, FCN, 4, 8, 3, 2, 2") or by pressing a designated provisioning button located on the device, the device being a telephone in this particular case. This deliberate operation prevents fraudulent or inadvertent provisioning of a device without the knowledge of the user. Also, if the system has been configured to have the cellular telephone manually locked by the WUPD, rather than automatically, the cellular telephone will have to be put in test mode in addition to being put in provisioning mode. As mentioned before, setting the cellular telephone in test mode can be done by either pressing a button, or by entering the same sequence used for invoking the provisioning mode. It is at this point where the cellular telephone locks on to the WUPD.

5) The WUPD transfers the necessary provisioning information to the target telephone using the telephone's air interface protocol (step 608). The WUPD's power level is as low as possible (e.g., 1 dB over the minimum sensitivity level of the cellular telephone, assuming that the sensitivity of the cellular telephone is approximately −100 dBm or better) to reduce the likelihood of fraudulent eavesdropping and intercept of provisioning information. As a result, the WUPD and the cellular telephone have to be in close proximity. Also, a clip-on antenna or shielding techniques might also be used for providing additional security. These techniques reduce the signal power that is transmitted into the air and therefore, further decrease the probability of eavesdropping.

6) The target telephone and the WUPD indicate that the provisioning operation is complete (step 610). Once the transfer is complete, both the target cellular telephone and the WUPD indicate on their respective displays that the provisioning operation is complete after sending notification signals to each other. Finally, the WUPD stores the provisioning information that was actually sent to the cellular telephone, and downloads this information into the Service Provider's database (step 612), so that the Service Provider can bill the user whenever a telephone call is made or received.

CONCLUSION

Provisioning a wireless device by using the WUPD improves upon conventional provisioning process, discussed in the background section, in which the provisioning information is generated by a Service Provider, and is then either distributed to a wireless device through electronic mechanisms, or entered by the customer through the keypad in the handset. The WUPD eliminates the need for different provisioning equipment and protocols by using the standard air interface protocol to communicate with each make and model of wireless devices.

The WUPD provisioning process is different from OTASP (shown in FIG. 2) since provisioning can be performed independent of the cellular/PCS network. Additionally, the WUPD's output power is relatively low compared with the power transmitted by a base station, and therefore reduces the likelihood of fraudulent eavesdropping or interception of important telephone information (e.g., cellular telephone A-key). This low output power feature provides security that is at least equivalent to existing provisioning methods, without incurring the cost and delays caused by expensive cryptographic processing.

The WUPD differs from the conventional provisioning device of FIG. 1 in that it performs cellular and PCS telephone provisioning using the common air interface protocol. Another difference is that the WUPD's software would be able to generate the provisioning information without the need to depend on transmission by the Service Provider.

It is important to protect provisioning information from interception since such information may include privacy and authentication keys used to prevent cellular telephone fraud. As mentioned above, the WUPD limits its signal output strength to the level required to program a wireless device in close proximity. By using low power at a close proximity or alternatively a clip-on antenna, the WUPD reduces the possibility of fraudulent interception of provisioning information. To further reduce the propagation of WUPD signaling information, the WUPD may use electromagnetic shielding. The shielding could encase the area (e.g., room) in which the provisioning is performed or may only encase the target wireless device. For improved convenience, the WUPD may use a cone shaped antenna hood or antenna enclosure that covers the target wireless device's antenna only.

To prevent inadvertent or fraudulent reprogramming of a wireless device, WUPD provisioning can only occur with the permission of the wireless device user. Thus, a designated provisioning sequence could be entered into the target device to set the device in provisioning mode. In the case where a small form-factor device such as a pager is the target, a programming pin or button could be pressed.

The WUPD has the flexibility of provisioning any device with the ability to receive wireless data. Two-way wireless communications devices may allow the WUPD to operate more efficiently. For example, when provisioning a cellular telephone, the WUPD can request the telephone's Electronic Serial Number (ESN) for future database recording. If the target device is a radio scanner, the WUPD can provision the scanner passively since the scanner cannot transmit information to the WUPD.

As long as the WUPD knows the target's air interface protocol and the target device has WUPD provisioning capability, the WUPD can provision cellular and PCS telephones, pagers, PDAs, gas meters, radio scanners, radio transceivers, garage door openers, etc.

By discussing the operation of the WUPD with regards to how it provisions a cellular telephone, it is intended to illustrate how the WUPD works with a wireless device that is part of one of the most complex commercial wireless networks known to date, namely, the cellular telephone network. Simpler applications, such as the provisioning of a pager, would be readily understood by one skilled in the art in light of the described provisioning operation of a cellular telephone. By focusing on this particular application it is not intended to limit the scope of the invention. On the contrary, as new methods and devices reach the market, the WUPD software can easily be upgraded to take advantage of the common air interface between such devices and their respective operational networks.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A system comprising:
a wireless communications device having a radio transceiver for communicating using a standard wireless interface, said radio transceiver including a transceiver antenna;
a wireless provisioning device that provisions said wireless communications device for use in a wireless communications network, said provisioning device operating independently from said wireless communications network, said provisioning device including:
a provisioning unit that controls the transfer of a provisioning message; and
a communication unit, connected to said provisioning unit; and
a wireline link interconnecting said transceiver antenna and said communication unit, said communication unit using said wireline link to transmit said provisioning message to said wireless communications device for receipt via said transceiver antenna to activate said wireless communications device.

2. A system as claimed in claim 1 wherein said communication unit transmits said provisioning message to said wireless communications device at a low power level.

3. A system as claimed in claim 2 wherein:
said wireless communications device exhibits a minimum sensitivity level of at least −100 dBm; and
said low power level is approximately one decibel over said minimum sensitivity level of said wireless communications device.

4. A system as claimed in claim 1 wherein said wireless communications network includes a Service Provider, and said provisioning message is generated by said Service Provider and electronically distributed to said provisioning device for transmission to said wireless communications device.

5. A system as claimed in claim 1 wherein said provisioning device generates said provisioning message.

6. A system as claimed in claim 1 wherein said communication unit includes an antenna, and said wireline link couples said communication unit antenna with said transceiver antenna of said wireless communication device.

7. A system as claimed in claim 1 wherein said provisioning device is in close proximity to said wireless communications device.

8. A system as claimed in claim 1 further comprising an electromagnetic shield encasing said transceiver antenna and said communication unit.

9. A system as claimed in claim 1 wherein said provisioning message includes a unique authentication key for distribution to said wireless communication device.

10. A method for provisioning a wireless device for use in a wireless communications network using a provisioning device, comprising:
selecting a wireless device to be provisioned;
interconnecting a transceiver antenna of said wireless device with a communication unit of said provisioning device using a wireline link;
generating a provisioning message;
placing said wireless device in a provisioning mode;
transmitting said provisioning message to said wireless device using said wireline link for receipt via said transceiver antenna, said transmitting operation being performed independent from said wireless communications network;
sending a notification signal to said wireless device using said wireline link for receipt via said transceiver antenna upon completion of said transmitting operation; and
storing said provisioning message that was transmitted to said wireless device in a database.

11. A method as claimed in claim 10 wherein said generating operation is performed by said provisioning device.

12. A method as claimed in claim 10 wherein said generating operation is performed by a Service Provider, and said method further comprises electronically distributing said generated provisioning message to said provisioning device.

13. A method as claimed in claim 10 wherein said placing operation is carried out by a user of said wireless device by entering a keypad sequence.

14. A method as claimed in claim 13 wherein said placing operation includes locking said wireless device to said provisioning device.

15. A method as claimed in claim 14 further comprising mimicking, prior to said locking operation, a control channel of an operational network of said wireless device, said mimicking operation being performed by said provisioning device.

16. A method as claimed in claim 14 wherein said locking operation includes placing said wireless device in a test mode to force said wireless device to tune to a predetermined frequency.

17. A method as claimed in claim 10 further comprising downloading said provisioning message from said database into a Service Provider database in association with said wireless device that has been provisioned.

18. A method as claimed in claim 10 wherein said provisioning message includes a unique authentication key for distribution to said wireless device.

19. A system comprising:
a wireless communications device having a radio transceiver for communicating using a standard wireless interface, said wireless communications device exhibiting a minimum sensitivity level of at least −100 dBm, and said radio transceiver including a transceiver antenna;
a wireless provisioning device that provisions said wireless communications device for use in a wireless communications network, said provisioning device operating independently from said wireless communications network, said provisioning device including:
a provisioning unit that controls the transfer of a provisioning message, said provisioning message including a unique authentication key for distribution to said wireless communication device; and
a communication unit, connected to said provisioning unit, and configured to transmit said provisioning message at a power level approximately one decibel over said minimum sensitivity level of said wireless communications device; and
a wireline link interconnecting said transceiver antenna and said communication unit, said communication unit using said wireline link to transmit said provisioning message to said wireless communications device for receipt via said transceiver antenna to activate said wireless communications device.

20. A method for provisioning a wireless device for use in a wireless communications network using a provisioning device, comprising:

selecting a wireless device to be provisioned, said wireless device exhibiting a minimum sensitivity level of at least −100 dBm;

interconnecting a transceiver antenna of said wireless device with a communication unit of said provisioning device using a wireline link;

generating a provisioning message, said provisioning message including a unique authentication key for distribution to said wireless device;

placing said wireless device in a provisioning mode;

transmitting said provisioning message to said wireless device using said wireline link for receipt via said transceiver antenna, said transmitting operation being performed independent from said wireless communications network, and said provisioning unit transmitting at a power level of approximately one decibel over said minimum sensitivity level of said wireless communications device;

sending a notification signal to said wireless device using said wireline link for receipt via said transceiver antenna upon completion of said transmitting operation; and storing said provisioning message that was transmitted to said wireless device in a database.

* * * * *